US005270886A

United States Patent [19]
Nigam

[11] Patent Number: 5,270,886
[45] Date of Patent: * Dec. 14, 1993

[54] TWO MOTOR SERVO SYSTEM FOR A REMOVABLE DISK DRIVE

[75] Inventor: Anil K. Nigam, Cupertino, Calif.

[73] Assignee: Antek Peripherals, Inc., Cupertino, Calif.

[*] Notice: The portion of the term of this patent subsequent to Aug. 7, 2006 has been disclaimed.

[21] Appl. No.: 791,707

[22] Filed: Nov. 14, 1991

Related U.S. Application Data

[63] Continuation-in-part of Ser. No. 390,596, Aug. 7, 1989.

[51] Int. Cl.⁵ ............................................. G11B 5/596
[52] U.S. Cl. .............................. 360/78.05; 360/77.03; 360/78.11; 360/78.12
[58] Field of Search ............... 360/78.05, 77.03, 77.08, 360/78.11, 78.12, 78.13

[56] References Cited

U.S. PATENT DOCUMENTS

| | | | |
|---|---|---|---|
| 3,597,750 | 8/1971 | Brunner | 360/77.03 |
| 3,733,592 | 5/1973 | Applequist et al. | 360/78.12 |
| 3,924,268 | 12/1975 | McIntosh et al. | 360/78.05 |
| 4,524,397 | 6/1985 | Chalmers et al. | 360/77.03 |
| 4,614,986 | 9/1986 | LaBudde | 360/78.05 |
| 4,630,145 | 12/1986 | Thompson et al. | 360/77.08 |
| 4,707,754 | 11/1987 | Patel et al. | 360/77.03 |
| 4,775,906 | 10/1988 | Suzuki et al. | 360/133 |
| 4,858,040 | 8/1989 | Hazebrouck | 360/78.05 |
| 4,875,120 | 10/1989 | Takahashi et al. | 360/78.5 |
| 4,933,795 | 6/1990 | Nigam . | |
| 4,942,484 | 1/1990 | Nigam . | |
| 4,977,471 | 12/1990 | Nigam . | |
| 5,027,234 | 6/1991 | Kawahara | 360/77.08 |
| 5,091,808 | 2/1992 | Nigam | 360/78.05 |

OTHER PUBLICATIONS

Lissner et al. "Disk File Actuator," IBM Technical Disclosure Bulletin, vol. 17, No. 10, Mar. 1975.

Primary Examiner—Aristotelis M. Psitos
Assistant Examiner—P. W. Huber
Attorney, Agent, or Firm—Townsend and Townsend Khourie and Crew

[57] ABSTRACT

The invention provides an improved disk writing system capable of storing larger amounts of information than heretofore possible. The disk mechanism incorporates a dual function servomechanism which includes a voice coil motor for driving the read/write head over long distances relatively quickly, and a stepper motor for precisely positioning the read/write head once it is in the desired region.

46 Claims, 8 Drawing Sheets

TWO MOTOR SERVO SYSTEM FOR A REMOVABLE DISK DRIVE

This patent application is a continuation-in-part of patent application Ser. No. 07/390,596, filed Aug. 7, 1989, entitled "*Two-Motor Servo Mechanism System for a Magnetic Disk Drive*", the full disclosure of which is incorporated herein by reference.

BACKGROUND OF THE INVENTION

1. Field of the Invention

This invention relates to disk drives for storing information in computer systems, and in particular to a servo system for a floppy disk drive which enables the storage of increased amounts of information on conventionally available floppy disks.

2. Description of the Prior Art

Floppy disk drives in computer systems operate by writing data onto a magnetic media, and then reading the data from the media, as desired by the user. The trend in floppy disk drives has been toward smaller and smaller disks, with the 5¼-inch disks of only a few years ago now being commonly replaced by 3½-inch disks, and with 2-inch disks already in use. As disk sizes have become smaller, computer system users have sought to store increased amounts of information on the disk. The storage of larger and larger amounts of information on the disk requires greater positional accuracy for the read/write head than ever before.

Prior art techniques for achieving the necessary positioning accuracy in a removable medium disk drive storage apparatus have consisted of both open loop servo systems and servo systems with active position feedback, commonly referred to as closed loop servo systems Removable medium disk drives typically consist of electromechanical systems, where a disk housed in a plastic shell is insertable in the disk drive apparatus. The drive mechanism causes this disk to be seated onto a spindle motor, which then rotates the disk at a specified rpm. Further, the mechanism in the drive positions a read and write transducer at various positions on the disk surface describing concentric tracks These tracks are centered at a specific point which may not coincide with the center of rotation of the spindle motor, and thus will have an eccentricity due to mispositioning of the insertable medium with reference to the centerline of the spindle motor. Locating these concentric tracks so that new information can be recorded onto the tracks or read back from the tracks is accomplished by a servomechanism. The specific requirements for this servomechanism is to identify the required track on the disk surface, move the read/write transducer to this position, and then maintain the transducer over this area so that the recorded information is directly underneath the read/write gap. A further requirement for such mechanisms is that the read/write gap must be accurately positioned in relationship to the centerline of the concentric track, so that only the required information is available to the head. All adjacent information must be appropriately distant from the gap, thereby having minimal influence on the reliability of the data recorded or read back from the medium.

Figure 1:
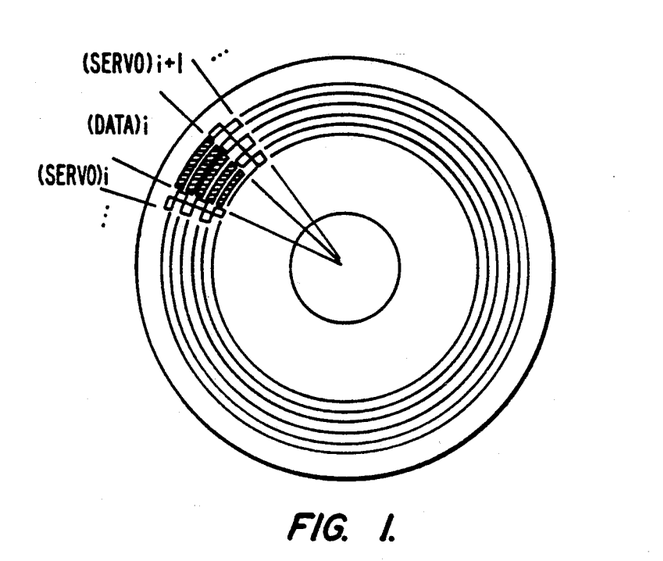
FIG. 1 is a plan view of a disk illustrating the recording of servo information on the data track itself.

Prior art techniques for removable disk reading and writing include placing prerecorded servo information on the specific track itself, as shown in FIG. 1. This technique is becoming increasingly popular, because the servo information is resident on the same track where data is being recorded or retrieved. The disadvantage, however, is that the servo information occupies space along with the user data, and thus an "overhead" must be considered. Specific examples are short bursts of servo information followed by user data as shown in FIG. 1. The servomechanism thus can only sample the data at specific intervals around the concentric track. Consequently, the mechanism can react only to those external disturbances detected by this specific sampling frequency. Thus, these systems have a limitation in bandwidth, namely, how rapidly they can compensate for disturbances compared with the dedicated technique.

In another prior art approach a disk surface is dedicated to having only continuous servo information recorded on it over the entire surface, on concentric tracks. A read transducer is continually sampling this information and reacts rapidly to all disturbances that might cause the servomechanism to misposition. The disadvantage of such a technique is that an entire disk surface, which could be used to store user data, is now used by the servo feedback information. Thus, these techniques have only been used in disk drive devices that consist of a multiplicity of disks, termed "disk packs" in the industry.

Both of the above techniques—servo information embedded on the track or on an entire disk surface—require a specialized mechanism that can record the necessary servo information on the disk surface. The equipment used to accomplish this task is called a servowriter in the industry. Servowriters are specialized devices similar to the disk drive mechanism except they are designed with actuator mechanisms with high positional accuracy. This higher positional accuracy is provided over the entire stroke on the disk surface. Consequently, servowriters are slow and require considerable time to generate the servo tracks on a disk medium. Multiple disk devices or disk packs also require a specialized spindle motor, normally with air bearings, so the off-balance load due to the disk pack does not cause the assembly to precess about an axis and thereby develop oblong and inaccurate servo tracks.

Figure 2:
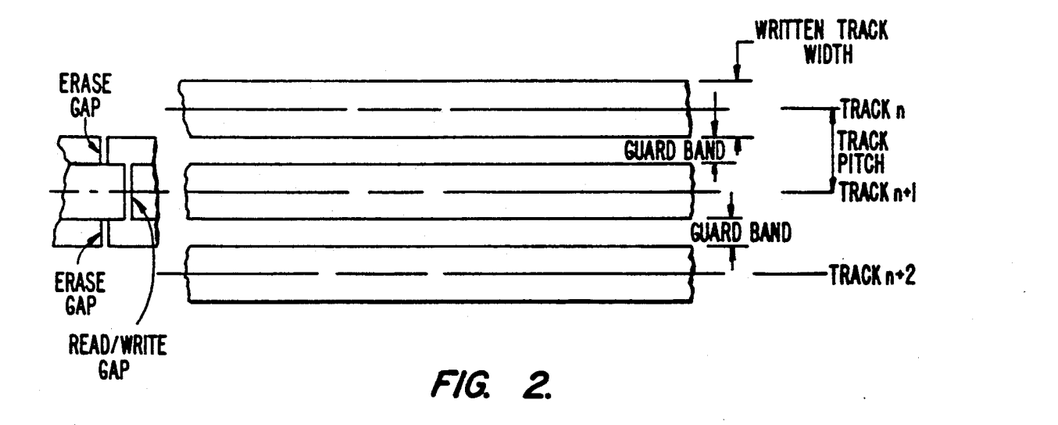
FIG. 2 is a view of guard bands placed around tracks to allow limited mispositioning of the read/write transducer.

Open loop techniques are also in use today, mainly in floppy disk drives. These techniques do not depend upon feedback information from the disk medium, but rely entirely upon the positioning mechanism to locate the read/write transducer to the specified track. This is accomplished by having an actuator mechanism that is an incremental positioning device and a set of erase only transducer elements on either side of the main read/write transducer. When such a device writes a track, the erase elements create a guard band of no data around the written track, as shown in FIG. 2. When these mechanisms position the read/write transducer to retrieve information from the track, the guard band allows limited mispositioning prior to the read/write transducer coming within the vicinity of the adjacent tracks. Such mechanisms are lower in cost and simpler to design. Unfortunately, the guard bands take up significant area and thereby provide a lower track packing density, and consequently result in a lower storage capacity per disk medium. Additionally, the incremental actuator is slow and thus the overall accessing performance is poor.

SUMMARY OF THE INVENTION

This invention provides a dual servo system which enables the storage of substantially greater amounts of information on a floppy disk than heretofore possible. In the preferred embodiment the servo system includes a magnet-and-coil apparatus for driving a carriage assembly having read and write heads mounted thereon at a desired velocity. Precise positioning of the carriage assembly is achieved using a stepper motor and scale/photodetector arrangement.

DETAILED DESCRIPTION OF THE PREFERRED EMBODIMENTS

Figure 12:
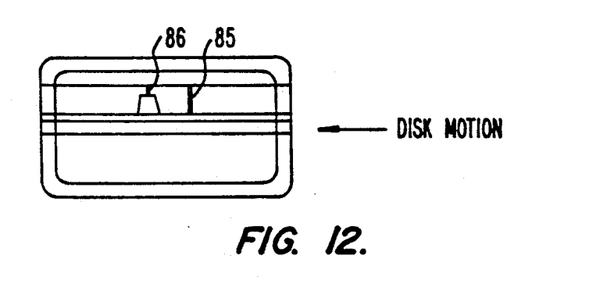
FIG. 12 is a detailed view of the read/write head.
Figure 22A:
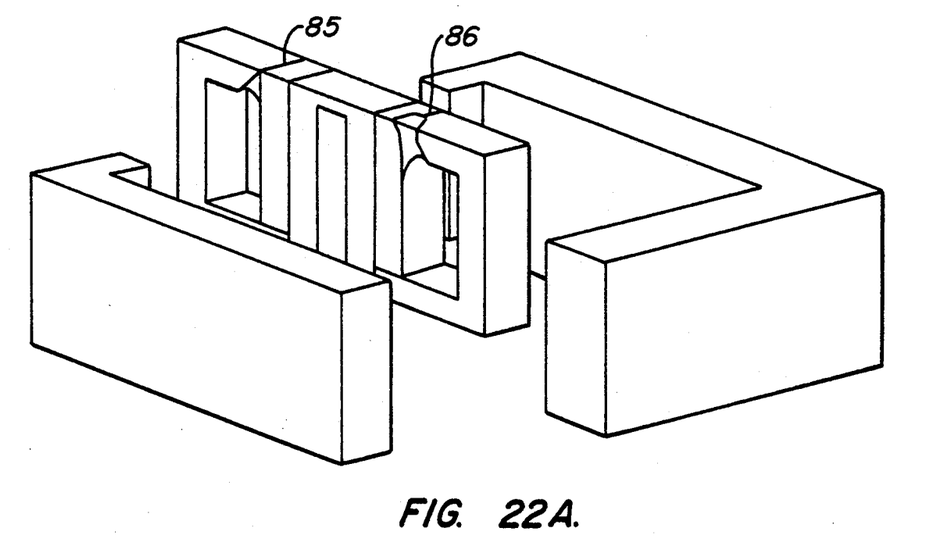
FIG. 22A illustrates the construction of the transducer rail of the read/write head of FIG. 12.
Figure 22B:
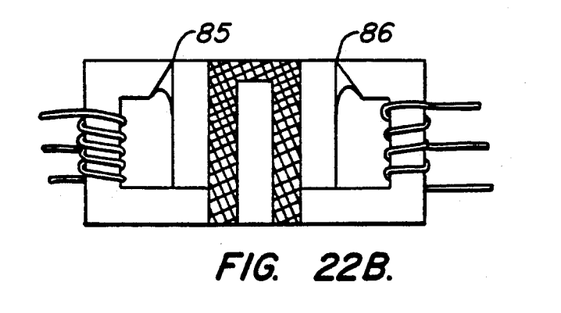
FIGS. 22B and 22C are top and front views, respectively, of the transducer rail of FIG. 22A.
Figure 22C:
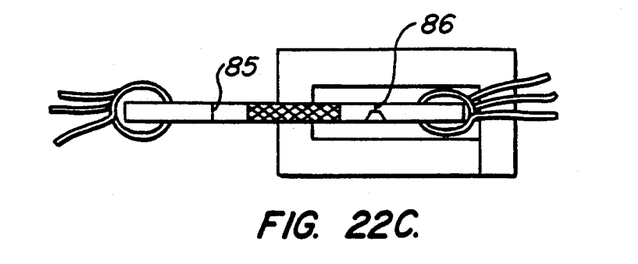

This invention provides an improved disk drive employing a single servomechanism without compromising accuracy or speed. Furthermore, the servo system allows information to be recorded upon and read back from disk media created by prior art open loop techniques. It also allows servo information to be written onto such media, in the "field," to attain higher track densities, without the need of expensive, "in-factory-use-only" servowriter mechanisms. This servomechanism coupled with a read/write transducer arrangements shown in FIG. 12, allows commercially available media to operate both as a standard low track density device or as a high track density device at the users command. The low track density read/write gap, 85, and the high track density read/write gap, 86, in the head assembly are constructed on a single rail, as shown in FIG. 22A–22C wherein these two gaps are separated by a non-magnetic structure of Calcium Titanate. A bar of Manganese Zinc ferrite is embedded in the middle of the Calcium Titanate structure. This Calcium Titanate area serves to separate the two gaps in space to minimize cross-talk between them, while the Manganese Zinc ferrite area allows for the incorporation of a magnetic shield ring around the high track density read/write gap, 86. The output signals from this gap would typically be much smaller than those from the low track density gap, 85. Consequently, this shield will allow the two transducers to operate concurrently. Such shielding techniques are commonly known in the industry.

Figure 3:
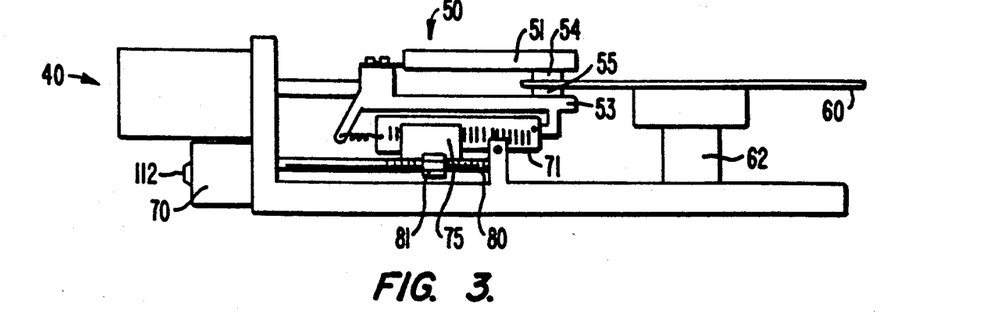
FIG. 3 is an overall view of the dual servo system of a preferred embodiment.

FIG. 3 is an overall view of the dual actuator system of a preferred embodiment of this invention. As shown in FIG. 3, the system generally includes a voice coil motor 40 which drives the head carriage assembly 50. The head carriage assembly includes a top arm 51 and a lower arm 53. Read/write heads 54 and 55 are carried by the carriage assembly to be positioned on the opposite sides of a floppy disk 60. The disk is turned by a spindle motor 62.

The head carriage assembly also include a stepper motor 70 which drives a screw 80 including a nut 81. At the other end of this shaft is a damper assembly 112. A scale 71 is disposed between the diffuser 79 and the secondary scale 73 in the apparatus to be read by photodetectors within housing 75.

Servomechanism

Figure 4:
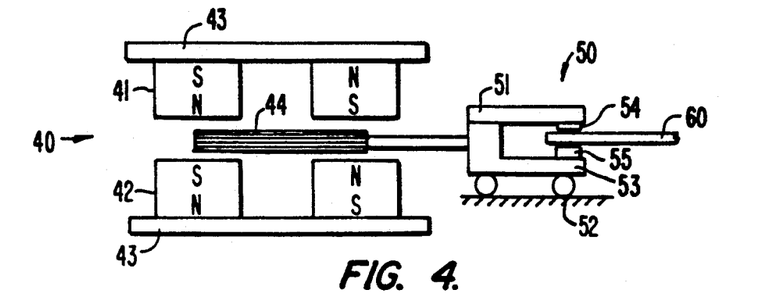
FIG. 4 is a detailed view of the voice coil motor.

As shown in FIG. 3, the servomechanism is supported by two actuators 40, 70. The main actuator 40, shown in FIG. 4, is a voice coil motor. This actuator typically consists of opposite magnet poles 41, 42 facing each other mounted on a backing plate 43, with a coil of wire 44 displaced in the gap configured between these opposing poles. A current in the coil 44 interacting with the magnetic field in the gap causes the development of a force. This force causes a head carriage assembly 50, supported by appropriate bearings 52 traveling on a surface, to attain a velocity. The carriage assembly includes upper and lower heads 54, 55 disposed on opposite sides of the disk 60. Alternate embodiments of a voice coil motor consist of a magnet attached to the carriage assembly displaced in a gap generated by a "C-shaped" soft iron core with a coil wrapped around it. These voice coil actuators allow rapid motion over longer distances compared to incremental motion actuators.

Figure 5:
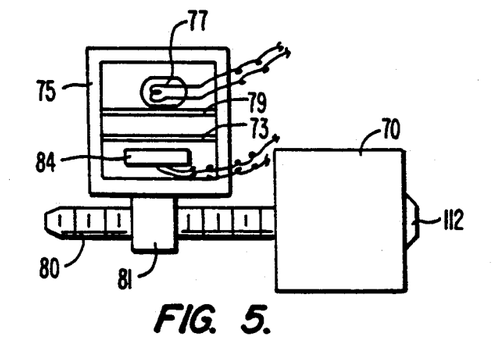
FIG. 5 is a detailed view of the stepper motor and photodetector.

The secondary actuator in the mechanism is a stepper motor 70, an incremental motion device. The motor and its assembly are shown in FIG. 5. This actuator is used for incremental motion over short distances. The damper 112 provides for monotonicity of motion by this actuator as well as removing any instability due to the two actuator configuration. It is used to servowrite the necessary information on commercially available disk media, and also bias the main actuator servo system to more accurately track the recorded information on the disk medium. The actuator provides the necessary positional accuracy to define data tracks in the high track density mode of operation, and also achieves better accessing performance over short distances, where voice coil actuators have poorer performance.

As shown in FIG. 3 the mechanism also includes a ruled scale 71. In a preferred embodiment this scale consists of a series of rectangular slots in a steel band of 0.038 mm thickness. These slots are spaced 0.1875 mm apart, while the slot width is 0.09375 mm, or half the slot pitch. Other embodiments could consist of dark lines on a glass strip or mylar material, or similar slots in other types of material strips. This scale is attached to the moving head carriage assembly 50 of the voice coil actuator as shown in FIG. 3. The scale provides the necessary position information to the voice coil control system to locate the head carriage assembly at tracks developed by prior art open loop apparatus.

Figure 6:
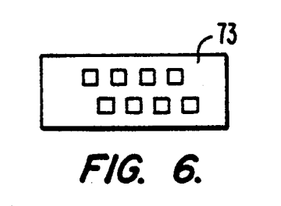
FIG. 6 is a detailed view of the secondary scale.

The servomechanism also includes another smaller scale 73 with two sets of slots, as shown in plan view in FIG. 6 to obtain a quadrature output from the detectors. In a preferred embodiment these slots are slightly less than half the height of the slots in the previously described main scale 71. The slots are arranged in two rows, one above the other as shown. The bottom row of slots is displaced by one slot width, or half pitch, from the top row of slots. This scale is attached to a housing 75 as shown in FIG. 5 such that in the apparatus the secondary scale 73 is attached to housing 75 and is interposed between the main scale 71 and a light source 77 with a diffuser plate 79. On the opposite side of the secondary scale 73 are mounted two photodetectors 84, one addressing the top row of slots and the other the bottom row of slots. The main scale passes in the area between the diffuser and the secondary scale and has slots extending the full height of both rows in the secondary scale.

Figure 7:
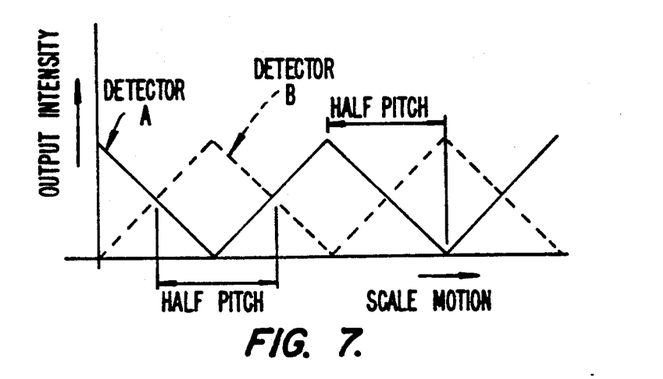
FIG. 7 is a graph illustrating the relationship between output light intensity and scale motion.
Figure 8:
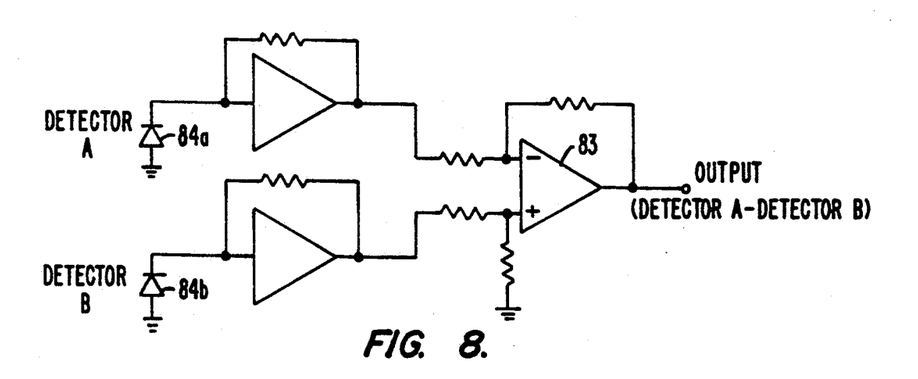
FIG. 8 is a block diagram of the difference amplifier for developing the error signal for servo control.
Figure 9:
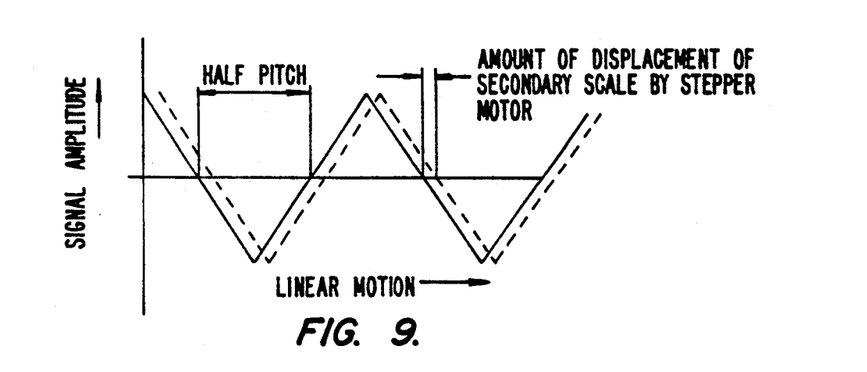
FIG. 9 is a graph illustrating the output signal from the circuit of FIG. 8 as a function of the motion of the scale.

The secondary actuator in a preferred embodiment is a 12.5 mm diameter, 20 step per revolution stepper motor 70 which rotates a screw 80. The housing 75 described above is attached to a nut 81 which is driven by screw 80. In the preferred embodiment, the helix angle of the threads on the nut and the screw are so configured to allow the stepper motor to move the stationary scale housing 1/9th the track pitch of open loop disk drive mechanisms for every full step. The function of the two scales is shown in FIG. 7, where if the stepper motor is kept stationary (in the "null position"), and the head carriage assembly is displaced, the outputs from the two photodetectors resemble the curves shown. If the signals from the two photodetectors are connected as shown in FIG. 8, then the output from the last amplifier 83 is the difference between the signals developed by the photodetectors. FIG. 9 shows this output signal.

As the stepper motor executes a step, the zero crossing points shown in FIG. 9 move as shown by the dotted lines. The magnitude of this displacement can be controlled by the design of the stepper screw and nut arrangement.

In a preferred embodiment the pitch of the slots on the two scales are so arranged to achieve zero crossings at a spacing of 0.09375 mm (half pitch). Furthermore, the stepper motor screw pitch is designed to cause the servo system associated with the voice coil actuator to move 0.0208 mm per step.

Servo Electronics

Figure 10:
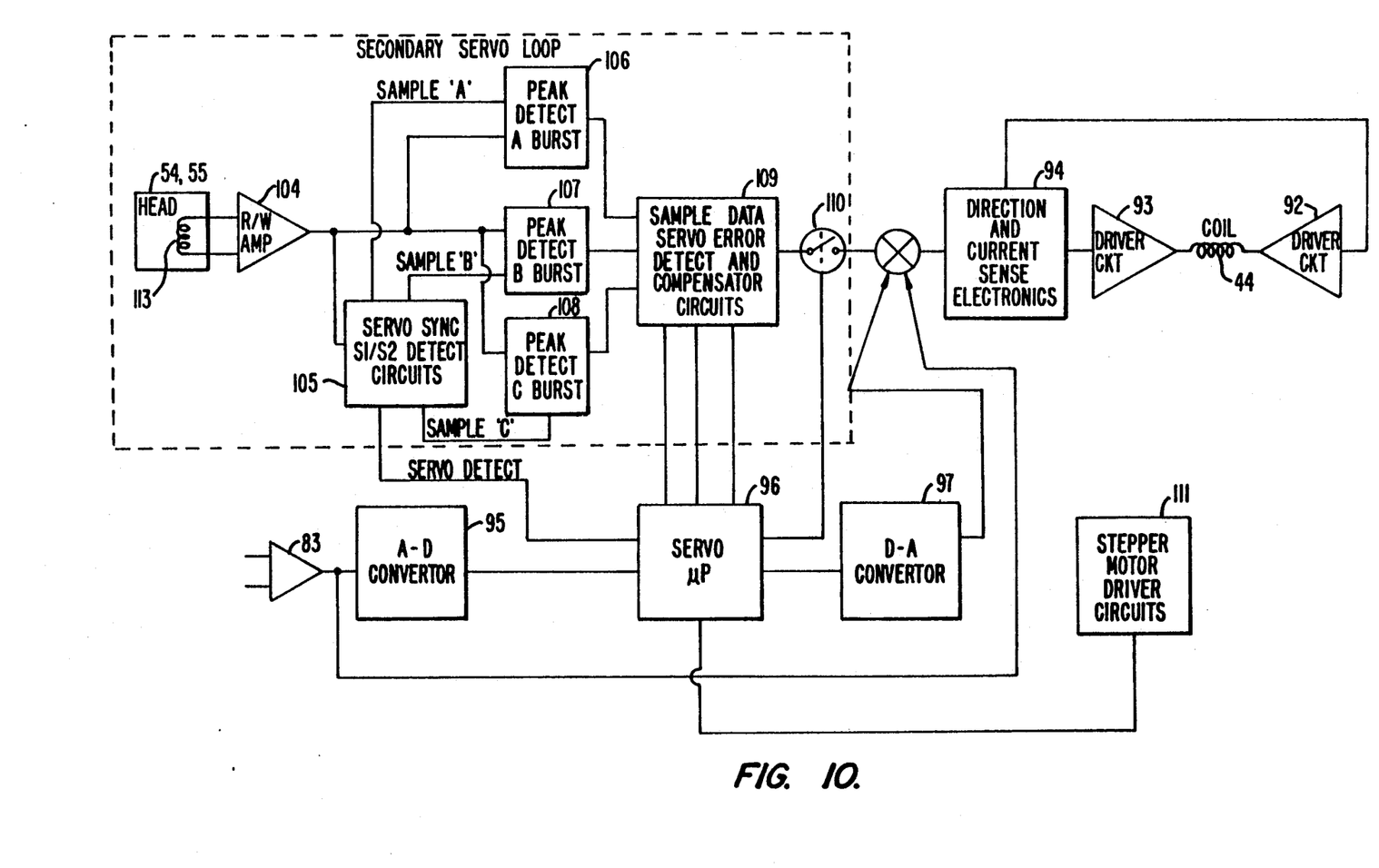
FIG. 10 is a block diagram of the servomechanism control electronics.

The voice coil actuator described above is a velocity control device, as opposed to the stepper motor, which is a position control device. The error signal for the voice coil servo is generated by the difference amplifier 83 shown in FIG. 8. Two driver circuits 92 and 93, coupled with direction and sense electronics 94, as shown in FIG. 10, cause currents to flow in the coil 44 of the voice coil actuator so that the required null position is always maintained. This servo loop can be considered similar in operational characteristics to prior art dedicated servo systems. Consequently, the servo system can attain a higher bandwidth, and thereby respond to disturbances that may be missed by lower bandwidth sampled data servoing apparatus.

An additional signal is provided to the loop through an A-D convertor 95 that samples the output of the differential amplifier 83 of FIG. 8. This is fed to a microprocessor 96 which in turn provides a DC voltage through a D-A convertor 97 at the difference point of the loop, to cause the servomechanism to assume various offset positions in a rapid manner. Additionally, this A-D convertor loop emulates electronically a higher density scale. The information so obtained can better control the voice coil actuator during a seek operation or during the track following sequence as described below.

Figure 11:
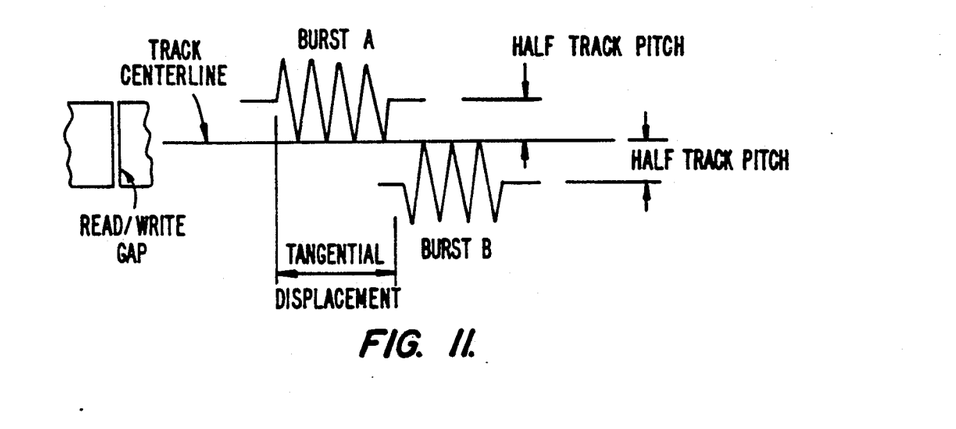
FIG. 11 is an illustration of a sample data burst pattern.

The secondary servo system is a sample data servo loop. To understand the functionality of this arrangement, consider two constant frequency bursts of many transitions recorded a half track width displaced from the specific track centerline. Assume these bursts are displaced from each other also in the tangential direction, so as to not interfere with each other, as shown in FIG. 11. Two peak detectors such as 106 and 107 sample the amplitudes of these bursts read through the head 54 or 55 and amplified by 104, one peak detector measuring the amplitude of the first burst, and the other measuring the amplitude of the second burst. An error signal is generated whereby a control system can be directed to seek a point where the two signals thus measured are of equal value. This technique is used by prior art sample data machines. The measurement transducer in this setup is the read/write transducer on the head itself.

Consequently, if there are a number of such bursts located at various positions around the track, information can be supplied to the servo system to allow it to position the read/write transducer, whereby the amplitude differences from both bursts at specific sample locations is minimized as the transducer moves over the tracks on the disk medium. In the specific apparatus FIG. 10 shows the voice coil, main servo loop and the sample data, secondary loop. The secondary loop can be connected or disconnected from the servo loop by the microprocessor 96 using switch 110. The respective read/write coil 113 for each head 54 and 55 read/write transducer, when appropriately selected, provides the analog signals read back from the tracks on the disk. This signal is amplified by 104 and fed into servo detect logic 105 and peak detectors 106, 107 and 108. The outputs of these peak detectors is appropriately conditioned by 109 to develop the necessary track following error signal. These signals are also fed to the microprocessor 96 so that this processor can provide the appropriate corrective action in the event a specific servo pattern around the disk circumference is not properly recorded due to media defects. Additionally, the microprocessor can use previously measured error information to provide a "look-ahead" control loop.

The major difference in this approach is that the main loop can rapidly position to tracks developed by prior art open loop mechanisms, while the secondary control loop provides the necessary real time feedback to allow the same apparatus to function in a high track density mode. This functionality allows this mechanism to maintain interchangibility both read and write with all existing disk media formats, while in its native mode the apparatus can attain much higher track packing density.

Thermal Compensation

In all disk drive apparatus the mechanisms are exposed to thermal and hydroscopic changes in the environment. These result in dimensional changes on all components and result in errors whereby the read/write transducer 85 and 86 can become mispositioned relative to its ideal location, or where the track pitch developed by the two scales becomes different at other environmental conditions.

The various components in the servomechanism are shown in FIG. 3. The materials used in the construction of the individual parts as well as the points where these parts are anchored determines the relative expansion coefficient of the overall system. This construction is defined in FIG. 3, where in a specific embodiment of the mechanism, the materials of the top 51 and bottom 53 arms are aluminum. A beryllium copper strip attaches the top head arm to the bottom head arm, whereby this arm is movable away from the bottom arm to allow the disk to be inserted between the heads. This arrangement attains equivalent expansions for both the top and bottom read/write transducers. The scale in this embodiment is made from stainless steel attached to the front of the carriage and loaded via a spring so as to maintain this component under tension, whereby all thermal expansions in this member are referenced from the front of the carriage. The casting in the said embodiment is made of aluminum. The stepper motor is attached to a flange on the casting and anchored at such a point, as shown in FIG. 3, to cause dimensional changes due to thermal expansion, to occur in a favorable manner for the stationary scale. All these individual component materials as well as their dimensions to the respective anchor points are optimized so that they operate together to cause the track to track spacing to remain relatively constant over a specified environmental range.

Servo Format

The mechanism described above is specifically configured to develop a unique servo format that can be written in the field by a user without specialized equipment. The servo format described consists of a coarse servo and a fine servo, wherein the coarse servo is developed using the low track density read/write gap 85 of FIG. 12 and the fine servo is developed using the high track density read/write gap 86 of FIG. 12. Such a servo format will allow a rapid positioning of the high density read/write transducer 86 to the appropriate track on the disk medium, in the event the servo system is powered off and then powered on. This is particularly valuable in applications which require conservation of power. This mode of operation commonly is termed "sleep" mode in the industry.

Figures 13, 14:
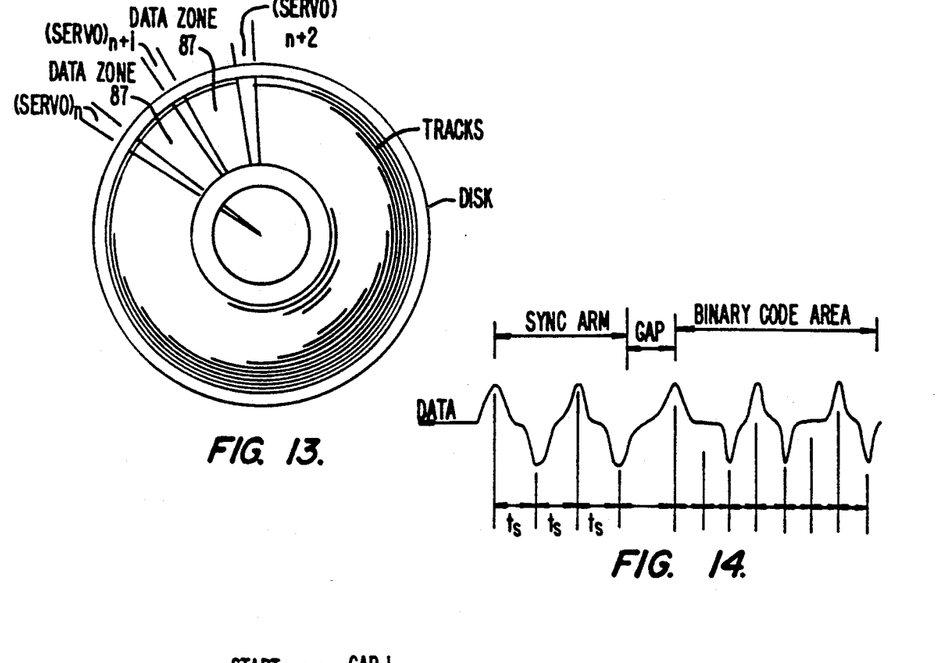
FIG. 13 is a plan view of a disk illustrating data zones and servo bursts employed by this invention.
FIG. 14 is a timing diagram illustrating the details of the leading information in the servo burst employed by this invention.
Figure 15:
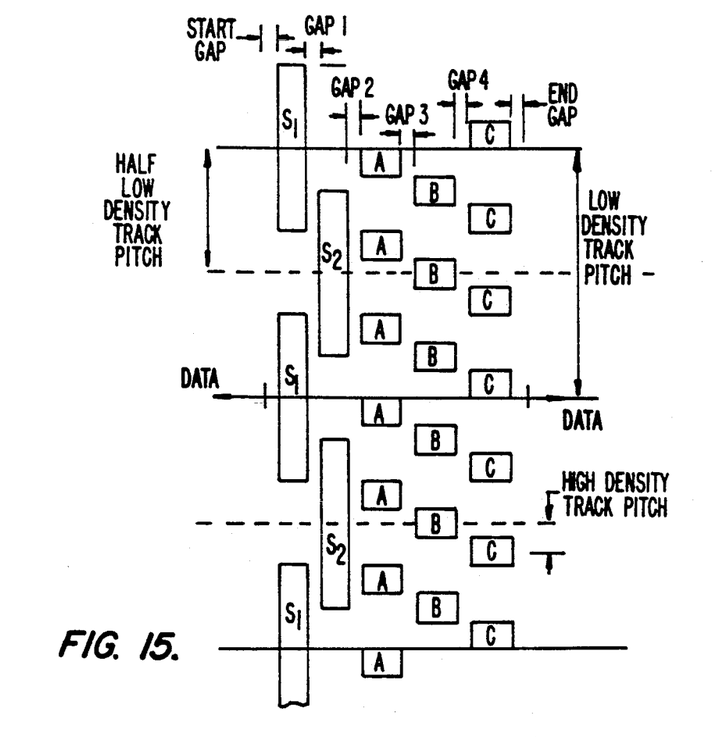
FIG. 15 is an expanded view of a servo burst on the disk surface illustrating the details of the servo burst and data tracks.

In one embodiment the servo format consists of 42 signal bursts equally positioned around the radial track as shown in FIG. 13. Data zones 87 are provided between these servo bursts. FIG. 15 is a drawing showing the details of each servo burst at the various positions shown in FIG. 13. The S1 and the S2 bursts are the leading patterns in the servo burst. These are developed by the low track density read/write gap 85 of FIG. 12. In a specific embodiment these are located at 0.09375 mm spacing along the radial line from the outer most track on the disk to the inner most track. The width of the read/write transducer 85 is larger than the spacing of these bursts; consequently, they are also displaced circumferentially so that during the writing process one pattern does not interfere with the other.

Each burst consists of a unique identification pattern as shown in FIG. 14. Four pulses lead the pattern. These pulses are separated from each other by a time period which will not occur in user recorded data 87. Furthermore, the configuration of these pulses is such that the three time sequences must be detected one after the other to signal a servo detect. Thus noise in the system does not result in false servo detects. Consequently, as the high track density read/write transducer 86 passes over such a large pattern the appropriate support electronics time transitions and signals the detection of a servo pattern. The trailing transitions in S1 and S2 consist of a binary coded number, in one preferred embodiment, at the regular data recording density. Other embodiments could consist of a "gray code" pattern. These transitions are separated by a suitable gap so as to minimize any peak shift in the detection of the succeeding signal peaks. In other embodiments this gap area could have transitions encoded to sync up the respective counters in 105. This binary number identifies each one of the S1 and S2 bursts from the outer most radius to the inner most radius. This part of the servo pattern forms the coarse servo. In the preferred embodiment the width of the servo marks, S1 and S2, are 0.137 mm wide, while these are spaced at increments of 0.09375 mm. The track spacing in the high track density mode in this embodiment is 0.0208 mm, and the width of the high track density read/write transducer 86 is 0.016 mm.

The large servo bursts, S1 and S2, are followed by three constant frequency bursts similar to those shown in FIG. 11. These are developed during the servowrite process by the high track density read/write transducer 86 of FIG. 12. All these bursts are displaced radially and circumferentially from each other and are labelled A,B, and C as shown in FIG. 15. The centerline of the high density tracks is established by the servo system where the read back amplitude of either the A-B and no C, or the B-C and no A or the C-A and no B bursts have equivalent amplitudes. Such a servo format allows differentiation of up to ±2.5 high density track widths. In the specific embodiment this organization has been chosen because mechanical and thermal expansions related to the mechanism and the disk medium could result in errors slightly less than ±0.025 mm. worst case. Thus the servo system has an adequate tracking and "visibility" band, where a read/write transducer gap, such as 86, cannot locate itself at a point where the tracking electronics could possibly be "lost," even though the S1 or S2 patterns register the correct track position. Furthermore, the S1 and S2 patterns allow the differentiation of the servo area from regular user data, as well as provide sampled data information to the control loop to cause the read/write transducer to be so positioned around the desired track, whereby positioning inaccuracy can be minimized.

The number and length of the servo bursts have been chosen such that a single data sector 87 will reside between two servo patterns. In addition, the sampling rate is chosen to be high enough so that the control system can effectively track positioning errors between the high track density read/write transducer 86 and the data track on the disk medium. These errors for the specific embodiment of a mylar disk consist of amounts concentrated at frequencies representing the disk revolution rate, twice this rate and three times this rate, due to the anisotropic expansion nature of the mylar medium.

Field Servowrite Procedure

In prior art machines all servowrite functions are performed by mechanisms which are specifically designed to maintain high positional accuracy over the entire radial recording zone on the disk medium. This results in these mechanisms being very slow, so the servowrite sequence takes considerable time. In this apparatus the stepper actuator provides the necessary positional accuracy and divides the "null" servoing locations established by the voice coil-scale arrangement into the desired number of high density tracks.

Figure 17:
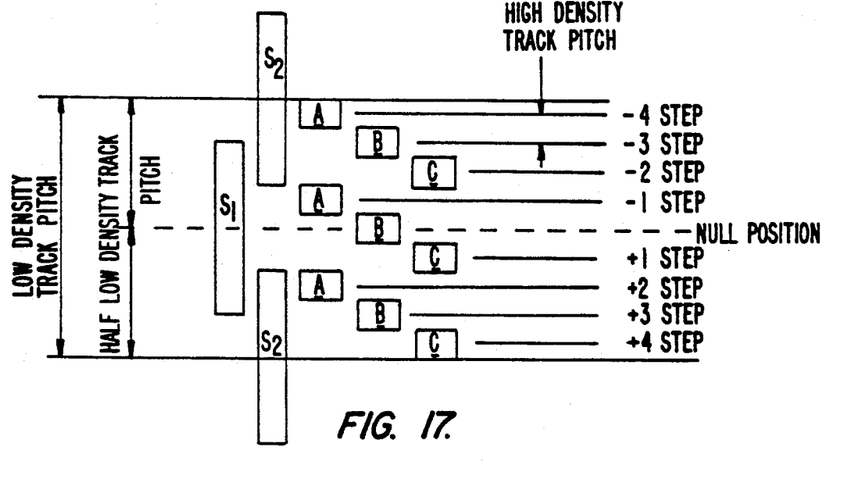
FIG. 17 is a plan view of a disk illustrating the relationship between low density track pitch and high density track pitch.

In a preferred embodiment the stepper motor is required to move ±4 steps from its "null" position as shown in FIG. 17. Furthermore, this null position is established so as to position the read/write transducer 86 in the position shown in FIG. 17 relative to its construction shown in FIG. 12 by issuing the necessary number of steps prior to starting writing the constant frequency bursts. This allows the high track density read/write gap 86 to develop the constant frequency servo burst patterns A, B and C at their appropriate positions, after detecting the S1 and the S2 leading patterns.

Figure 16A:
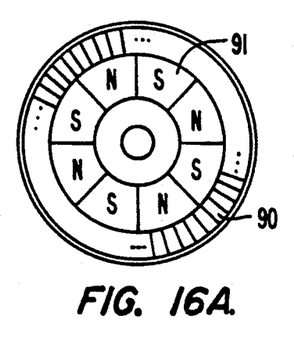
FIG. 16a and 16b are views of the spindle motor magnetic pole arrangement.
Figure 16B:
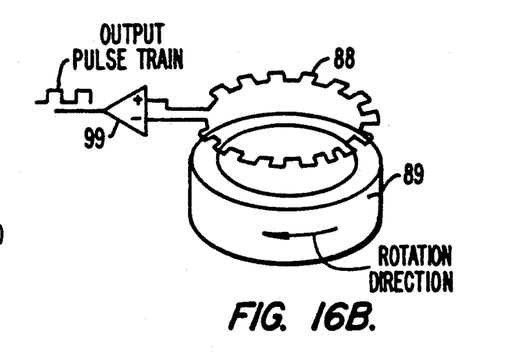

The next requirement of a servowriter equipment is to also locate these various servo bursts equally around the circumference of the track. To achieve this the spindle motor has a field coil 88 in close proximity to a number of magnetic poles 90 on the motor rotor 89. In other embodiments this arrangement can consist of an optical or magnetic encoder. Most spindle motor assemblies used in floppy disk drives today have such a field coil arrangement as shown in FIG. 16. The pulses generated by the field coil through amplifier 99 normally are used to control the speed of the motor. In the servo system apparatus these pulses are configured to be in some relationship to the number of servo bursts to be recorded tangentially around the track. In a specific embodiment there are 82 pulses around the track circumference, but other values could also be used supported by the necessary electronics.

Figure 18:
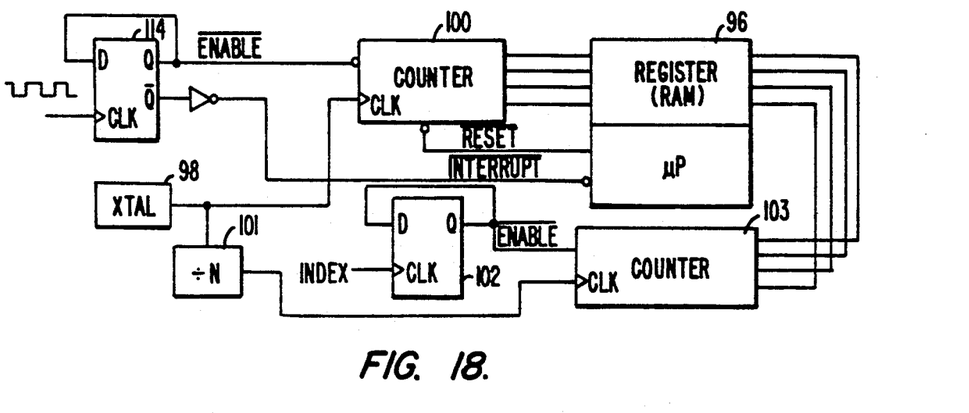
FIG. 18 is a block diagram of a control circuit for the microprocessor processing information developed from FIG. 16(b).

The separation in time of these pulses would usually contain some manufacturing tolerances, they may not have the necessary accuracy to locate the sampled data servo patterns around the track circumference. To overcome this, as shown in FIG. 18, the apparatus includes another circuit feeding information to the servo microprocessor 96. The crystal clock 98 is the event signal, while the pulses developed by the field coil through 99 turn on the counter 100 through the flip flop 114. The following pulse turns off the counter 100. The main counter 103 is triggered by mechanical index in the apparatus and the values from this counter, are referenced through an appropriate divider 101 and control flip flop 102 to the crystal 98, locate the position of each pulse referenced to mechanical index. The respective counter values 100 and 103 are loaded into a register as shown in FIG. 18. This sequence then is continued until an average is achieved for all the relevant pulses. This average value will be available as an array of numbers stored in the RAM of a microprocessor 96. Thus in this apparatus a low cost field coil has been calibrated by appropriate electronics to achieve correction values which can now be used in the servowriting process.

The servowrite sequence consists of erasing the disk medium by having a current flow through the coils of the large width, low track density read/write transducer 85, as the voice coil actuator servo system locates this transducer at each and every "null" location as shown in FIG. 9 from the outer radius to the inner radius of the disk. The operation consists of moving the head from one "null" position to the next, then allowing the read/write transducer to remain at this "null" position for one entire revolution per disk surface, prior to moving to the next "null" position.

On the return path the servo sync patterns S1 and S2 with the binary coded track numbers, as shown in FIG. 14, are written at the specified number of positions around the track circumference. The correction table described above is used to position these at equidistant intervals around the track circumference for each disk surface. In a preferred embodiment this consists of 42 positions around the disk circumference located 0.09375 mm along the radial line from the outer radius to the inner radius on the disk.

The next sequence then is performed by the high track density read/write transducer 86. The voice coil actuator is positioned at every other "null" position as shown in FIG. 9. The stepper motor then steps, causing the entire head/carriage assembly 50 to be appropriately located at each one of the points as shown in FIG. 17 to generate the constant frequency bursts using the high track density read/write transducer 86. This recording is done on all disk surfaces only after the head locates the appropriate servo sync pattern S1 or S2. Then "write-gate" is turned on after an elapse of the appropriate time. There are three time sequences, namely, to record the A pattern, the B pattern and the C pattern. After all nine tracks are recorded on all disk surfaces the stepper motor returns to its null position. This is accomplished by executing the necessary number of steps and then a few more beyond the null position. The head is then stepped into the "null" position from the same direction to minimize all hysteresis inaccuracies typically associated with stepper motor systems.

The servowrite sequence is depicted in FIG. 17. After each set of nine tracks are recorded by the high track density read/write transducer 86, and after the stepper motor returns to its null position, the "voice" coil actuator is moved to its next position. This sequence is continued until the inner most radius on the disk medium.

Servo Tracking

Figure 19:
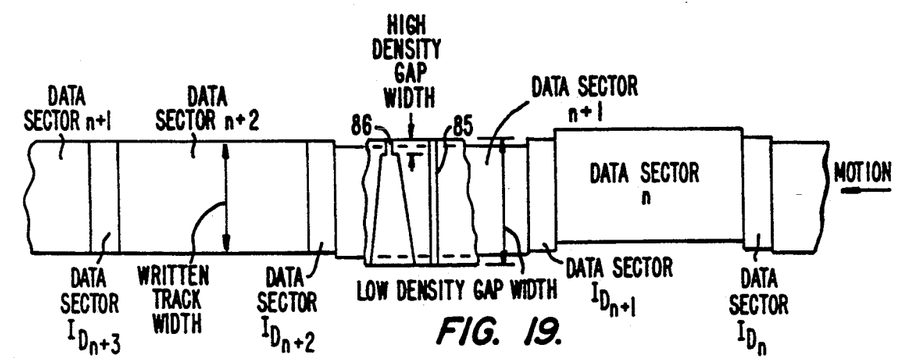
FIG. 19 illustrates the relationship between the read/write head of this invention and the data tracks generated by open loop mechanisms.
Figure 20:
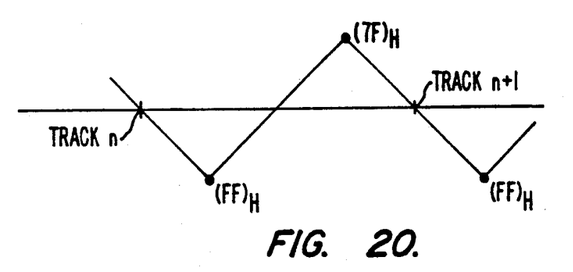
FIG. 20 illustrates the position of the low density tracks with reference to the photodetector output of FIG. 8.

The servo tracking feature of the apparatus involves two modes of operation. In a commercial application this mechanism is required to perform read and write functions employing the appropriate recording transducer element shown in FIG. 12, on either a low track density medium or a high track density medium. The low track density disk medium is presently in widespread application. These media are currently generated utilizing open loop mechanisms, and often consist of recording tracks which are separated by 0.1875 mm. The written track width is 0.125 mm, and each track is bounded by a guard band, as shown in FIG. 2, of 0.0625 mm. When such a disk media is positioned in the apparatus a condition similar to that depicted in FIG. 19 will occur. The head of the apparatus consists of the low track density read/write gap 85 of 0.137 mm width. This gap is located in the disk drive at exactly the same position in reference to the disk radial line as that in the standard open loop disk drives. The high track density read/write gap 86 is collinear with one edge of the low track density read/write gap 85 and is displaced by an amount whereby it trails this gap. The voice coil actuator and scale assembly are configured where the appropriate track centerlines with reference to the output of 83, are those shown in FIG. 20. The A-D convertor 95 associated with the servo electronics digitizes the respective position signal from the difference amplifier 83 of FIG. 8 into values which go from 7F(Hex) to FF(hex) as shown in FIG. 20. The written track in the medium consists of ID areas followed by the respective data as shown in FIG. 19. For normal read operations the voice coil-scale servo locates the head carriage assembly at the zero crossing points shown in FIG. 20. For a write operation the low density read/write transducer detects the appropriate ID field on the data track, and then the servo system attempts to move the actuator such that the high track density gap 86 measures a value of 50% of the maximum track amplitude it reads. The appropriate A-D reading is then recorded by the servo microprocessor. This operation is continued over the entire revolution of the disk medium with the appropriate values being recorded for each data sector. In the next revolution the low density read/write transducer is located using the stored values in the microprocessor, with the additional requirement that the transducer position be displaced by approximately 0.012 mm towards the side at which the low density 85 and the high density 86 gaps are collinear.

Using this arrangement the low density gap 85 will be able to completely erase all prior information recorded on the medium and the high density gap 86 can further be used to perform a trim erase function. The advantage of this approach is that the medium could at an earlier time have also been recorded by a similar apparatus. Additionally, the low density recording transducer gap 85 in that specific apparatus could have been different, due to manufacturing tolerances, than the one writing the required information. The approach described above is able to accommodate such an occurrence, as well as completely erase all previous information more accurately than standard open loop devices. The written track width generated by this apparatus in the low density mode is close to that developed by prior art open loop apparatus. Furthermore, in the event of a data error during a routine read operation, this mode could be turned on to retrieve the recorded information more accurately.

Figure 21:
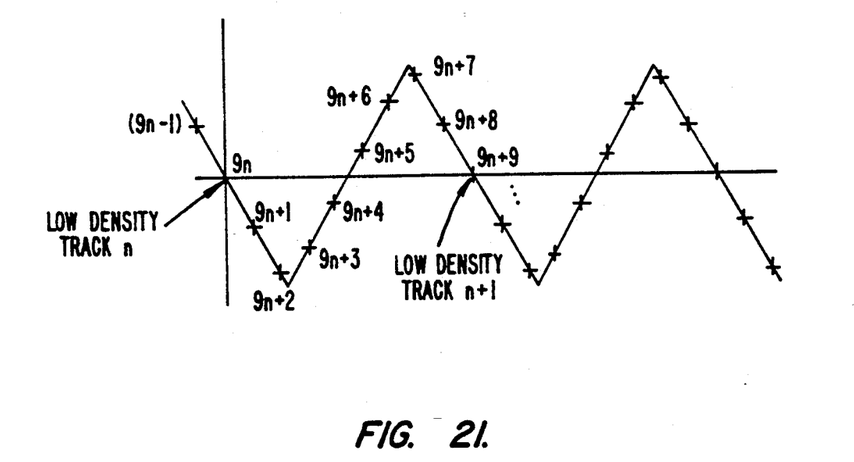
FIG. 21 illustrates the position of the high density tracks with reference to the photodetector output of FIG. 8.

In the high track density mode, in a preferred embodiment, nine high density tracks are located in the area previously occupied by two low density tracks. This is depicted in FIG. 21 using the output of the difference amplifier 83 of FIG. 8. Typically, these tracks are located on mylar. As mentioned earlier, mylar has a anisotropic expansion characteristic. This requires that the mechanism track the recorded information to maintain very low misalignment between the high track density read/write transducer 86 and the recorded data track. The necessary real time feedback information in this situation is provided by the sample data servo patterns pre-recorded around the track. This information would normally be stored in the microprocessor 96 RAM as A-D values developed from the main scale photodetectors while the servo loop is locked onto the sampled data servos. This data can also be used to achieve a look-ahead control system as well as account for media defects. An additional feature available is that a seek to the adjacent track can be accomplished by moving the secondary actuator (the stepper motor) by one step, rather than providing a DC off-set voltage to the voice coil control loop. Using such an approach the circumferential tracking control loop can be kept constant and attain satisfactory control on the adjacent track in the least amount of time. This results in shorter track to track access times than prior art sampled data servomechanisms.

I claim:

1. A servomechanism for controlling the position of a read/write head in a magnetic disk drive having a base, a carriage assembly and a detector comprising:
    a read/write head mounted on the carriage assembly for being positioned with respect to magnetic media on which information can be stored;
    a voice coil motor mounted on the base and coupled by a shaft to the carriage assembly for rapidly moving the carriage assembly along a first axis to position the carriage assembly at a desired location;
    a stepper motor mounted on the base for moving the detector to detect the position of the carriage assembly along the first axis and in response thereto generate a signal to control the voice coil motor; and
    wherein the carriage assembly included an optically-readable scale affixed to the carriage assembly and wherein the detector includes a photodetector for detecting the position of the scale, information from the detector being used to position the carriage assembly at coarse positions along the first axis.

2. A servomechanism as in claim 1 wherein the detector can be offset incrementally by the stepper motor for fine positioning of the carriage assembly along the first axis.

3. A servomechanism as in claim 2 wherein each coarse position of the carriage assembly along the first axis is divided into a multiplicity of fine positions along the same first axis.

4. A servomechanism as in claim 1 wherein the read/write head assembly provides for at least two different track densities.

5. A servomechanism as in claim 1 wherein the read/write head assembly includes a low track density read/write gap and a high track density read/write gap configured in-line and displaced from each other so as to operate on data tracks of the magnetic media in a linear and related manner.

6. A servomechanism as in claim 5 wherein the read/write head includes a single transducer rail, the read/write gaps being disposed collinearly along the transducer rail.

7. A servomechanism as in claim 5 wherein the width of the low track density read/write gap is larger than about 0.131 mm by an amount at least equal to the width of the high track density read/write gap.

8. A servomechanism for controlling the position of a read/write head in a magnetic disk drive having a base, a carriage assembly, and a detector comprising,
a read/write head mounted on the carriage assembly for being positioned with respect to magnetic media on which information can be stored, said read/write head including at least two read/write gaps configured in-line to allow at least two different track densities to be generated;
a voice coil motor mounted on the base and coupled to the carriage assembly movable along a first axis;
an optically readable scale affixed to the carriage assembly;
a stepper motor mounted on the base for moving the detector to read the optically readable scale;
a servo system using information from detection of the optically readable scale to control the position of the carriage assembly along the first axis in coarse positions and in a multiplicity of offset fine positions generated by the incremental displacement of the detector by the stepper motor.

9. A servomechanism as in claim 8 wherein said servo system uses signals from a dedicated servo system and a sampled data servo system.

10. A servomechanism as in claim 9 wherein data from the detector is input to an analog to digital converter and a microprocessor, the microprocessor providing an output signal used by the dedicated servo system to further sub-divide the positioning of the carriage assembly along the first axis.

11. A servomechanism as in claim 9 wherein the sampled data servo system utilizes sampled data from the high track density read/write gap to develop feedback information, and wherein the dedicated servo loop utilizes the feedback information to provide continuous control of the carriage and head assembly during operation to follow the data tracks on the magnetic media.

12. A servomechanism as in claim 10 wherein the servo system characterizes the eccentricity of a data track on the magnetic medium as offset positions of the optically readable scale, said positions being stored in the microprocessor.

13. A servomechanism as in claim 8 further comprising a top read/write head for positioning over one surface of the magnetic media and a bottom read/write head for positioning over a second opposing surface of the magnetic media, the bottom read/write head being mounted on a lower arm affixed to the carriage assembly, and the top read/write head being mounted on an upper arm affixed to the lower arm.

14. A servomechanism as in claim 13 wherein the upper and lower arms thermally expand and contract equivalently with changes in temperature.

15. A servomechanism as in claim 13 wherein the upper arm is affixed to the lower arm by a flexible strip.

16. A servomechanism as in claim 15 wherein the flexible strip is beryllium copper.

17. A servomechanism as in claim 8 wherein the optically-readable scale is rigidly affixed at a first end to the carriage assembly and is coupled to a spring at a second opposing end, the spring being coupled in tension to the carriage assembly, such that any thermal expansion of the optically readable scale along the first axis will occur in the direction of said spring.

18. A servo mechanism as in claim 8 wherein the read/write head is configured to write a servo pattern on the magnetic medium, the servo pattern comprising a coarse servo pattern and a fine servo pattern.

19. A servomechanism as in claim 18 wherein the read/write head has a low track density read/write gap for writing the coarse servo pattern and a high track density read/write gap for writing the fine servo pattern.

20. A servomechanism as in claim 19 wherein the low track density read/write gap is configured to write the coarse servo pattern in a form comprising groupings of unique magnetic transitions written at prescribed circumferential and radial positions on the magnetic medium.

21. A servomechanism as in claim 20 wherein the low track density read/write gap is further configured to write each grouping of magnetic transitions in the coarse servo pattern with an identifier one of magnetic transitions circumferentially spaced such that the spacing of the transitions does not correspond to the spacing of recorded data.

22. A servomechanism as in claim 21 wherein the low track density read/write gap is further configured to write the identifier zone with a plurality of magnetic transitions of unique length to eliminate noise interference.

23. A servomechanism as in claim 21 wherein the low track density read/write gap is further configured to write the identifier zone followed by a sequence of magnetic transitions that establish a specific radial location identifier for each grouping of transitions of the coarse servo pattern.

24. A servomechanism as in claim 20 wherein the low track density read/write gap is further configured to write the groupings of magnetic transitions in the coarse servo pattern at separated radial and circumferential positions, so that each can be written by the low track density read/write gap without affecting the other.

25. A servomechanism as in claim 23 wherein the high track density read/write gap operates within at least four coarse position zones provided by the radial and circumferential positions of the groupings of magnetic transitions.

26. A servomechanism as in claim 24 wherein the high track density read/write gap has a width which is small compared to the radial dimension of the magnetic transitions in the coarse servo pattern so that the magnetic transitions can be located and read quickly to rapidly locate the position of the carriage assembly along the first axis.

27. A servomechanism as in claim 20 wherein the high track density read/write gap is configured to write at least two constant frequency burst patterns following the transitions in the coarse servo pattern, smaller in radial width than the coarse servo pattern, displaced both radially and circumferentially from each other.

28. A servomechanism as in claim 29, wherein the high track density read/write gap writes at least three constant frequency burst patterns.

29. A servomechanism as in claim 27, wherein the high track density read/write gap writes the constant frequency burst patterns radially at positions corresponding to the high density track pitch.

30. A servomechanism for controlling the position of a read/write head in a magnetic disk drive having a base, a carriage assembly, and a detector comprising;

a read/write head mounted on the carriage assembly for being positioned with respect to a magnetic medium on which information can be stored, wherein the head includes at least two read/write gaps configured in-line to allow at least two different track densities to be generated;

a spindle motor configured to rotate the magnetic medium around an axis in a plane perpendicular to the plane containing the motion of the carriage assembly;

voice coil motor mounted on the base and coupled to the carriage assembly along a first axis;

an optically readable scale affixed to the carriage assembly;

a stepper motor mounted on the base for moving the detector to read the optically readable scale;

a servo system configured around the optically readable scale to actively and rapidly control the position of the carriage assembly along the first axis in coarse positions and fine positions;

a servo pattern written on the magnetic medium by each of the read/write gaps of the read/write head, the pattern being easily identifiable and representing coarse and fine positions of the carriage assembly along the first axis.

31. A servomechanism as in claim 30 wherein the servo pattern includes a coarse radial null position corresponding to at least one full step position of the stepper motor.

32. A servomechanism as in claim 30 wherein the fine positions of the servo pattern are generated at respective full step positions of the stepper motor.

33. A servomechanism as in claim 30 wherein the spindle motor has a transducer to identify coarse circumferential positions.

34. A servomechanism as in claim 33 wherein the coarse circumferential positions are calibrated against a crystal clock phase-locked to the spindle motor to develop accurate circumferential reference positions.

35. A servomechanism as in claim 34 wherein the circumferential reference positions are used to trigger the writing of sectored servo patterns around the magnetic medium.

36. A servomechanism as in claim 30 wherein the magnetic medium is completely erased by positioning the carriage assembly at the coarse radial positions.

37. A servomechanism as in claim 30 wherein the carriage assembly is positioned at the coarse radial positions to write a coarse servo pattern.

38. A servomechanism as in claim 30 wherein the carriage assembly is positioned at positions corresponding to successive full steps of the stepper motor to write the fine servo pattern.

39. A servomechanism as in claim 31 wherein the read/write head is moved into each coarse radial null position by the stepper motor from the same direction to minimize hysteresis error.

40. A servomechanism as in claim 30 wherein the servo system uses the transfer characteristic of the detector to position the carriage assembly such that the slope of the transfer characteristic is identical whenever the carriage assembly is positioned over a low density track.

41. A servomechanism as in claim 40 wherein the servo system establishes discrete electronic offset positions corresponding to positions along the transfer characteristic of the detector.

42. A servomechanism as in claim 38 wherein the high track density read/write gap provides positional information to position the low track density read/write gap more accurately.

43. A servomechanism as in claim 41 wherein the high track density read/write gap serves to selectively erase the edges of the low track density data tracks to create a dead bandgap between said data tracks.

44. A servomechanism as in claim 43 wherein the discrete electronic offset positions are used to position the high track density read/write gap to perform said selective erasing.

45. A servomechanism as in claim 30 further comprising a sample data servo pattern written on the magnetic media, wherein the servo system continuously samples data from the sample data servo pattern and uses said data and the transfer characteristic of the detector to anticipate the necessary positioning of the read/write heads.

46. A servomechanism as in claim 30 wherein the read/write head is positioned over a single data track by utilizing the preset stepper motor positions without requiring actuation of the voice coil motor.

* * * * *